Aug. 16, 1932. H. J. BURNISH 1,872,241
APPARATUS FOR ARC WELDING
Filed Sept. 6, 1929 2 Sheets-Sheet 2
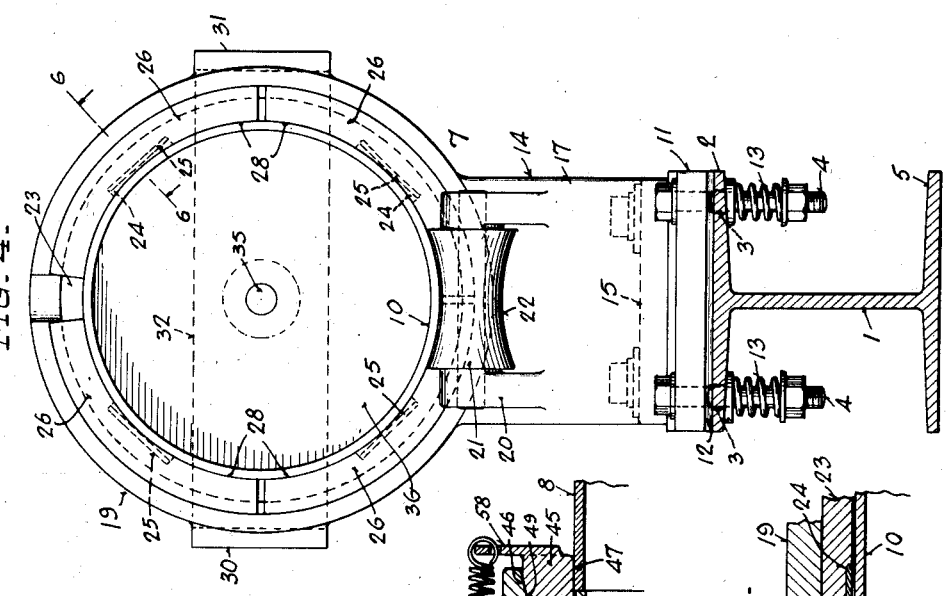
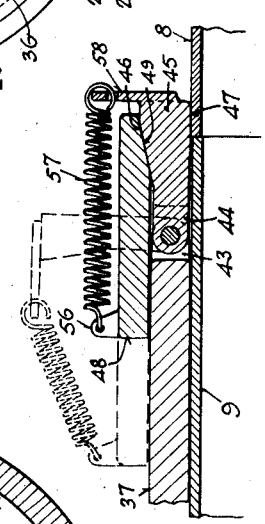
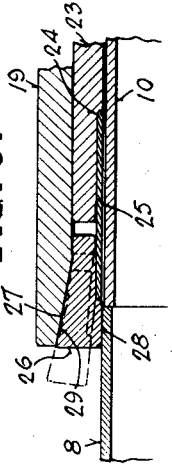
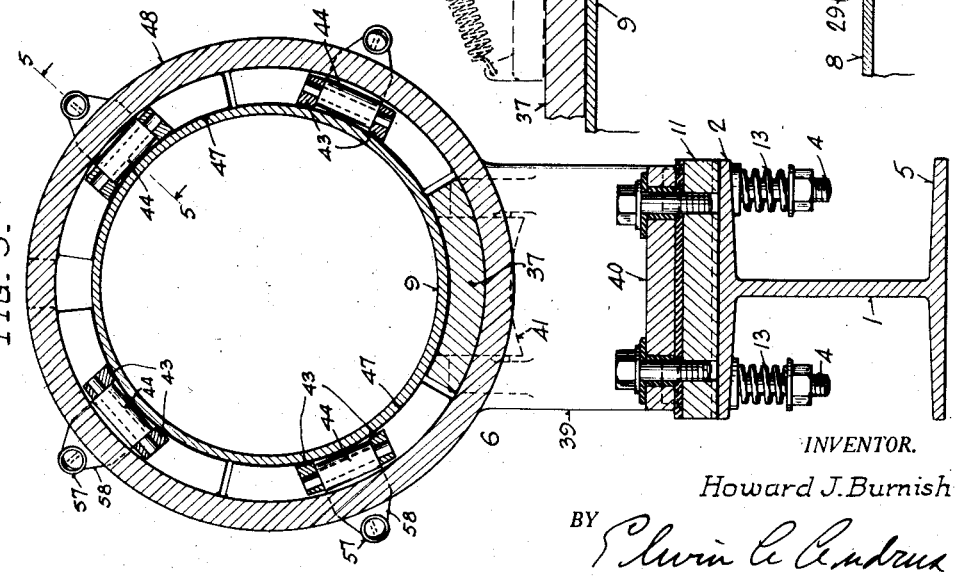
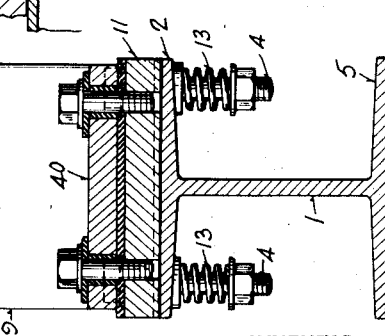
INVENTOR.
Howard J. Burnish
BY
ATTORNEY.

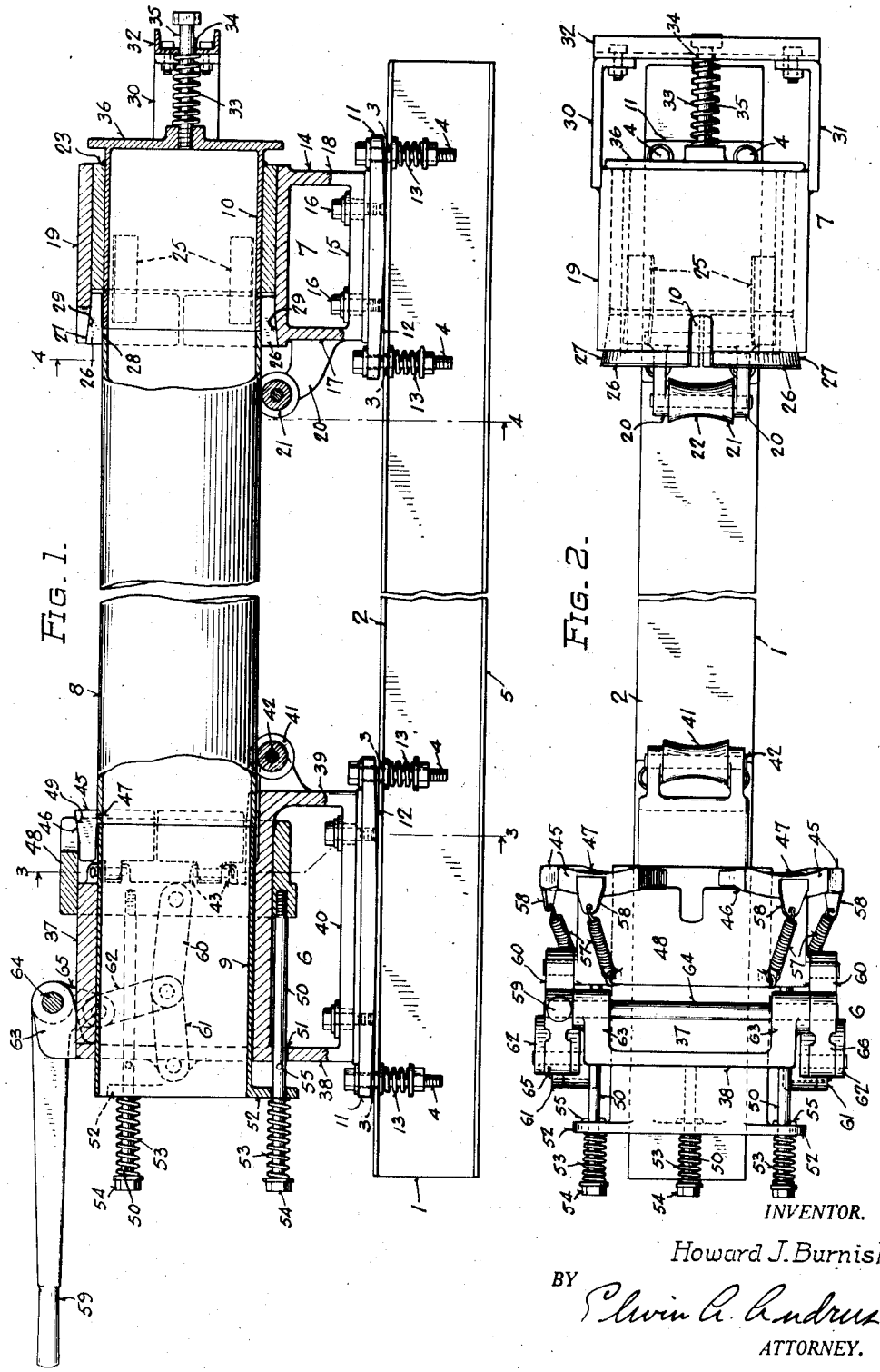

Patented Aug. 16, 1932

1,872,241

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

APPARATUS FOR ARC WELDING

Application filed September 6, 1929. Serial No. 390,736.

This invention relates to electric arc welding and particularly to a method of and apparatus for the progressive arc welding of longitudinal seams.

In the process aforementioned, the passage of the electric current from the arc through the article being welded tends to set up definite magnetic flux conditions in the article that reflect directly upon the characteristics of the arc and the weld resulting therefrom.

The longitudinal position of the weldrod with respect to the article has a definite bearing upon the flux conditions before mentioned. This is particularly noticeable when the weldrod is within the zones adjacent the ends of the article being welded.

In order to weld a seam wherein the portions of the weld adjacent the ends is comparable with the weld at the intermediate portion, it has heretofore been necessary for the operator to provide and maintain a careful and constant adjustment of the feeding of the weldrod during the beginning and the finishing of the welding operation, and, in spite of the careful adjustments necessary, it has heretofore been difficult to provide a weld having the desirable uniform characteristics throughout its entire length, because of the varying flux conditions during the welding operation.

The invention has for its object the providing of a method and apparatus whereby the difficulties above-referred to may be substantially eliminated.

A further object is to maintain uniform and desirable flux conditions during the welding operation.

A further object of the invention is to avoid the necessity of carefully adjusting the feeding of the weldrod when the welding is being effected in the zones adjacent the ends of the article being welded.

In order to overcome the difficulties beforementioned, the invention contemplates the provision of flux carrying members which are adapted to abut against the ends of the article adjacent the weld thereof and to provide in effect an extension of the article, in order that the flux conditions set up at the ends may be the same as those during the welding of the intermediate sections.

The invention is particularly applicable to the manufacture of tubular articles, such as pipe, employed in the transportation of oil, water, gas, and other fluids.

Reference is now made to the accompanying drawings illustrating the preferred embodiment of the invention in which:

Figure 1 is a longitudinal sectional view of the machine showing the tubular article in position for welding.

Fig. 2 is a top plan view of the machine showing the clamping jaws in open position.

Fig. 3 is a transverse sectional view of the machine on line 3—3 of Figure 1 looking in the direction of the arrows.

Fig. 4 is a transverse sectional view taken on line 4—4 of Fig. 1, looking in the direction of the arrows, the work being omitted.

Fig. 5 is a sectional view taken on line 5—5 of Fig. 3.

Fig. 6 is a sectional view taken on line 6—6 of Fig. 4.

In the drawings, the numeral 1 indicates a frame suitably secured to the floor and adapted to support the clamping mechanism for maintaining the flux carrying members in electrical contact with the ends of the article.

The frame is preferably in the form of an I-beam having the upper flanges 2 thereof perforated at desirable points 3 for receiving the securing bolts 4 anchoring the machine to the frame. The lower flanges 5 are secured to a foundation in any suitable manner.

The machine, according to the invention, provides clamping mechanisms 6 and 7 adapted to firmly clamp the opposite ends of the article 8 to be welded and to bring the flux carrying members 9 and 10 into firm electrical and magnetic contact with the ends of the tubular article.

Both clamps 6 and 7 are provided with a base 11 having the bottom face 12 thereof preferably beveled as indicated in the drawings and provided with apertures for receiving the securing bolts 4. In order to maintain the flux carrying members in electrical contact with the ends of the tubular article throughout the entire circumference thereof during the welding operation and to allow for warping of the article due to the localized heating adjacent the seam, the securing bolts are provided with spring mountings 13 whereby a limited rocking movement on the beveled surface of the base 11 may be effected.

The clamping mechanism 7 is provided with a supporting bracket 14 which comprises a bottom portion 15, suitably secured to the base as by bolts 16, and a pair of spaced upright members 17 and 18 which support a longitudinally extending drum 19.

The upright member 17 on the clamping mechanism is provided with a bracket 20 which extends axially from below the drum and has secured thereto a suitable guiding roller 21 which is preferably provided with a curved face 22 for supporting and guiding the tubular article 8.

In order that the opposite ends of the article may be clamped simultaneously and with a minimum of labor and expenditure of time, the invention provides means whereby the clamping action at one end of the article may be effected by a longitudinal movement of the article to be welded, which movement is accomplished during the clamping action of the mechanism at the opposite end of the tubular article.

To this end the drum 19 on the clamping mechanism 7 is adapted to slidably receive a sleeve member 23 which is rigidly secured at suitable intervals by welding or otherwise to the flux carrying ring 10. The sleeve 23 is substantially shorter than the drum 19 and the flux carrying ring, and is provided with a plurality of inwardly extending recesses 24 in which is adapted to be secured one end of leaf spring members 25.

The other ends of the leaf springs 25 are secured to segmental wedge-shaped clamping jaws 26 having inclined outer surfaces 27 and having the inner surface 28 thereof adapted to firmly grip the end of the article to be welded when in clamping position. The drum 19 is provided on its inner walls adjacent the forward end thereof with a bevel surface 29 complementary to the inclined surface 27 of the clamping jaws, so that a rearward movement of the clamping jaws 26 will cause the same to contract and firmly grip the tubular article.

The drum 19 is provided with a pair of rearwardly extending arms 30 and 31 to the rear ends of which a channel-shaped cross arm 32 is secured forming a backing for a spring 33. The cross arm is provided with a guiding aperture 34 in a suitable position for receiving the guide rod 35 which latter is secured to a closure member 36 suitably fastened to the rear end of the flux carrying ring 10, as is clearly shown in Figs. 1 and 2.

The spring 33 normally urges the flux carrying ring 10 together with the clamping jaws 26 and the sleeve 23 forwardly. When the clamping jaws are in forward position, the leaf springs 25 urge the jaws outwardly to maintain the same in open position, as shown by the dotted lines in Fig. 6.

It will be seen from the above description that an endwise movement of the tubular article from left to right, as shown in Figure 1, will first bring the end of the tubular article 8 into abutment with the flux carrying ring 10 and thereafter cause the flux carrying ring, the sleeve 23, and the clamping jaws 26 to slide rearwardly in the drum against the tension of the spring 33. The rearward movement of the clamping jaws will effect a gripping action of the same on the end of the tubular article because of the beveled surfaces on the clamping jaws and the drum, which give a wedging action to the jaws.

The clamping mechanism on the opposite end of the tubular article is provided with means for affecting the endwise movement of the tubular article to be welded and to further effect a clamping of both ends of the tubular article.

To this end the clamping mechanism 6 comprises a drum 37 suitably supported by brackets 38 and 39 on a plate 40 which is secured to the base 11. The drum 37 is suitably proportioned to slidably receive the flux carrying ring 9. The forward bracket 39 is further adapted to support a roller 41 suitably journaled as at 42.

The drum is provided on its forward end with a plurality of pairs of spaced ears 43 between which is adapted to be pivoted the tongues 44 of segmental wedge-shaped clamping jaws 45 which have outer inclined faces 46 and inner curved faces 47 conforming to the curvature of the tubular article 8 to be welded and adapted to grip the same when the clamping device is in closed position.

Slidably mounted on the forward end of the drum 37 is a collar 48 having an inner inclined face 49 adjacent the forward end thereof to conform with the inclined surface 46 of the wedge-shaped jaws. The collar is further provided with a plurality of rearwardly extending longitudinal guide bolts 50 extending through suitable apertures 51 in the rear upright 38 and received in spaced lugs 52 extending outwardly from the flux carrying ring 9.

Spring mountings 53 are provided between the lugs 52 and the heads 54 of the guide bolts to normally urge the flux carrying ring 9 into contact with the tubular article. The guide bolts 50 are provided with transverse pins 55 adapted to engage the lugs 52 to withdraw the flux carrying ring 9 when the clamping jaws are released.

The rear end of the collar is further provided with a plurality of upwardly extending lugs 56 to each of which is attached one end of a spring member 57, the other end of the spring member being attached to upwardly extending lugs 58 on the clamping jaws 45 so that when the collar 48 is moved rearwardly, the spring tension will effect the opening of the jaws, as shown by the dotted lines in Fig. 5, to permit the insertion and removal of the article to be welded.

Operating mechanism is provided for effecting a sliding movement of the collar 48 relative to the clamping jaws 45 and the drum 37, and preferably consists in a toggle mechanism connected to an operating handle 59. The toggle mechanism preferably comprises a pair of oppositely disposed links 60 each of which is secured at one end thereof to the collar 48 and having the free end pivotally connected to one end of the links 61 and 62. The links 61 are pivotally mounted on the rear upright 38. The rear upright is further provided adjacent the top thereof with a pair of spaced lugs 63 in which is journaled a shaft 64, one end of which is rigidly connected to the operating handle 59. The operating handle 59 is provided with an angular extension 65 having the end thereof pivotally connected to one of the links 62. The other end of the shaft 64 has an arm 66 rigidly secured thereto, which is pivotally connected to the other link member 62.

The flux carrying rings 9 and 10 are preferably of slightly smaller diameter than that of the tubular article 8 to be welded to provide a certain clearance between the clamping fingers and the ring to enable the former to rigidly clamp the tubular article. The flux carrying rings are preferably of a composition similar to that of the tubular article in order that the flux in the latter may be readily transferred into the former and to provide uniform flux conditions throughout the entire length of the tubular article.

The operation of the device may be briefly explained as follows: When the clamping mechanism is in open position, as shown in Fig. 2 and by dotted lines in Figs. 5 and 6, the tubular article is placed onto the rollers 21 and 41 and positioned between the clamping members 6 and 7. The operator then presses the handle 59 downwardly and the toggle mechanism effects a forward movement to the collar 48, moving the pins 55 from the lips 52 of the ring 9, and permitting the spring 53 to force the flux carrying ring 9 into engagement with the tubular article and moving the same into engagement with the flux carrying ring 10 of the clamping member 7.

The springs 53 combined, having greater compression strength than the spring 33 of the opposite clamping mechanism, effect a further longitudinal movement of the tubular article which causes the clamping jaws 26 of the clamping member 7 to firmly grasp the tubular article. The further forward movement of the collar 48 effects a wedge action between the same and the clamping jaws 45 on the operating end and causes the same to firmly grip the tubular article.

After completion of the welding operation, the handle may be operated in the other direction to withdraw the collar 48 from the clamping members 45, and relieve the clamping pressure thereof. The withdrawal of the collar 48 further relieves the action of the springs 53, thus allowing the spring 33 to advance the flux carrying ring 10, the member 23 and the work to relieve the clamping pressure of the jaws 26. A further movement of the collar carries the pins 55 into engagement with the lugs 52 on the flux carrying sleeve 9 and withdraws it from the work, so that the finished article may be removed and another blank inserted.

The invention thus described provides a method whereby the article being welded forms in effect an intermediate section of a longer article formed by the section itself and the flux carrying members 9 and 10. It will thus be seen that the magnetic conditions set up throughout the entire length of the article being welded will be substantially the same as would normally occur in the intermediate section thereof during the welding operation.

Although the invention has been described in connection with the welding of longitudinal seams in tubular articles, it is understood that various modifications may be made within the scope of the accompanying claims.

I claim:

1. An apparatus for the progressive arc welding of tubular articles of definite lengths comprising ring members adapted to abut the opposite ends of the tubular article, means for clamping said ring members in electrical contact with the ends of said tubular article, and means responsive to longitudinal movement of the tubular article for operating one of said clamping means.

2. In an apparatus for the progressive arc welding of tubular articles of definite lengths, means for clamping the opposite ends of said tubular article and means responsive to longitudinal movement of said tubular article for operating one of said clamping means.

3. A work support for tubular articles comprising clamping means adapted to clamp the opposite ends of the tubular article, means for operating one of said clamping means, means responsive to said last named clamping action for effecting the movement of the tubular article, and means responsive to longitudinal movement of the tubular article for operating the other of said clamping means.

4. An apparatus for the progressive arc welding of tubular articles comprising flux carrying members adapted to abut the opposite ends of the tubular article, means for clamping said flux carrying members in abutting relation to the ends of said tubular article, means responsive to an endwise movement of the tubular article for operating one of the clamping means, means for manually operating the other of said clamping means, and means responsive to the last named clamping means for effecting an endwise movement of the tubular article.

5. In an apparatus for progressive arc welding of tubular articles, a ring-shaped flux-carrying member, means for aligning a tubular article axially with respect to said member, and means for clamping the flux-carrying member in abutment against one end of the tubular article to improve the welding characteristics thereof.

6. In an apparatus for progressive arc welding of pipe, a pair of ring-shaped flux-carrying members disposed to receive the ends of the pipe being welded, means for aligning the pipe and the flux-carrying members, and means for securing the members in abutment against the ends of the pipe to improve the welding characteristics thereof.

7. In an apparatus for progressive arc welding of pipe, a ring-shaped flux-carrying member disposed to receive one end of the pipe being welded, a sleeve carrying a plurality of wedge-shaped clamping members secured to the flux-carrying member, and means for actuating the wedges to clamp the pipe in abutment against the flux-carrying member.

8. In an apparatus for electric arc welding sheet metal pipe, a flux-carrying ring disposed to receive one end of the pipe being welded, a plurality of clamps carrier by a sleeve encompassing the ring, and means responsive to endwise movement of the pipe for actuating the clamps against the pipe to hold it in abutment against the ring to facilitate welding.

9. In an apparatus for electric arc welding sheet metal pipe, in combination, a pair of flux-carrying rings disposed to receive respective ends of the pipe being welded, means for aligning the pipe with respect to said rings, and means for securing the pipe in abutment with the rings during the welding operation to improve the welding characteristics of the pipe adjacent its ends.

10. In an apparatus for electric arc welding sheet metal pipe, in combination, a pair of flux-carrying rings disposed to receive the ends of the pipe being welded, clamping means at one end of the pipe disposed to be actuated by longitudinal movement of the pipe for securing the respective flux-carrying ring to that end of the pipe, means at the opposite end of the pipe for clamping the other ring to the pipe, and manually operable means for effecting a longitudinal movement of the pipe and for simultaneously actuating the clamping mechanism not operated by the movement of the pipe.

In testimony whereof I have hereunto signed my name at Milwaukee, Wisconsin, this 3rd day of September, 1929.

HOWARD J. BURNISH.